United States Patent
Nastacio et al.

(10) Patent No.: US 7,644,013 B2
(45) Date of Patent: Jan. 5, 2010

(54) SYSTEM AND METHOD FOR RESOURCE OPTIMIZATION

(75) Inventors: Maria Nastacio, Ft. Lauderdale, FL (US); Chris Pittman, Ft. Lauderdale, FL (US); Jerold R. Treger, Ft. Lauderdale, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 1079 days.

(21) Appl. No.: 10/770,684

(22) Filed: Feb. 3, 2004

(65) Prior Publication Data

US 2005/0125274 A1    Jun. 9, 2005

Related U.S. Application Data

(60) Provisional application No. 60/527,453, filed on Dec. 4, 2003.

(51) Int. Cl.
*G06Q 30/00* (2006.01)
*G06F 17/50* (2006.01)

(52) U.S. Cl. .......................... 705/26; 705/7
(58) Field of Classification Search ........... 705/26, 705/7
See application file for complete search history.

(56) References Cited

U.S. PATENT DOCUMENTS

| | | | | |
|---|---|---|---|---|
| 5,197,004 A | * | 3/1993 | Sobotka et al. | 705/8 |
| 5,206,903 A | * | 4/1993 | Kohler et al. | 379/265.12 |
| 5,416,694 A | * | 5/1995 | Parrish et al. | 705/8 |
| 6,115,690 A | * | 9/2000 | Wong | 705/7 |
| 6,275,812 B1 | * | 8/2001 | Haq et al. | 705/11 |
| 7,246,074 B1 | * | 7/2007 | Hutchins et al. | 705/7 |

OTHER PUBLICATIONS

Going with the Flow to Dunn et al., Info World, v19, n1, p52(7), Jan 6, 1997.*

* cited by examiner

*Primary Examiner*—Matthew S. Gart
*Assistant Examiner*—Garcia Ade
(74) *Attorney, Agent, or Firm*—Fitzpatrick, Cella, Harper & Scinto (57) ABSTRACT

The present invention includes a method and system to facilitate managing of local and remote resources. The invention facilitates access to a resource engine, for the automatic grading, tracking, scoring, and assigning of resources based on the resource's skills and skill sets. The invention also facilitates the automatic grading, tracking, scoring, and assigning of tasks and/or applications based on the skills and skill sets needed to perform the tasks and/or applications. The invention uses one or more engines to combine relationships for resources, tasks, skills and time entry to determine expected completion times and efficiencies. The engine may include grading and scoring a resource's skills sets, dividing applications into various tasks, determining the desired resource skills sets to complete the tasks, and matching a resource's skills sets with the desired skills sets for the tasks.

16 Claims, 5 Drawing Sheets

SYSTEM AND METHOD FOR RESOURCE OPTIMIZATION

CROSS REFERENCE TO RELATED APPLICATIONS

This application claims priority to, and the benefit of, U.S. Provisional patent application entitled "System and Method for Resource Optimization" filed on Dec. 4, 2003, by inventors Jerold R. Treger and Chris Pittman and assigned U.S. Ser. No. 60/527,453, the entire contents of which is hereby incorporated by reference.

FIELD OF INVENTION

This application generally relates to resource optimization, and more particularly, to an improved method and system for facilitating the management, assignment, grading, and tracking of resources, tasks, applications, and skills.

BACKGROUND OF THE INVENTION

A variety of hardware and software applications exist which, in a limited way, allow companies to keep track of their resources. For example, Microsoft Project® is a software application that allows companies to plan and track projects in order to increase business performance and efficiency. However, most project/resource management tools require a user to manually enter and plan a project. For example, the user must often decide a project's scope, the kind of tasks associated with the project, the number of resources needed, and the availability of resources. Many times, the decisions are not accurate because a user often attempts to merely predict the scope of these items. Further, if problems develop along the way, the user typically must reschedule and try to account for the problems. Moreover, most project/resource management tools do not combine time entry with resource and task planning. Thus, a user may assume that a resource is logging eight hours a day on a task, but in reality, the resource may only be logging five hours.

Additionally, the available project/resource management tools do not generally provide for grading or scoring of resources and/or resource efficiencies. It may be difficult, therefore, to plan the effectiveness of different resources. For example, a senior engineer may be more efficient and effective at a given task than an entry-level engineer. Further, because of the global aspect of many businesses, certain managers monitor resources located in remote places. However, most project/management tools do not offer standard criteria for grading and tracking resources to assist in remote management. Further, many project/management tools do not provide sufficient capabilities for matching a resource to tasks most-suited to the resource's skill levels.

SUMMARY OF THE INVENTION

The present invention includes a method and system to facilitate managing of local and remote resources. In accordance with one aspect of the present invention, the invention facilitates access to a resource engine, wherein the resource engine may be used to automatically grade, track, score, and assign resources based on the resource's skills and skill sets. The resource engine may be used to automatically grade, track, score and assign tasks and/or applications based on the skills and skill sets needed to perform the tasks and/or applications.

The resource engine may also use one or more engines (e.g., algorithms) to combine relationships for resources, tasks, skills and time entry to determine expected completion times and efficiencies. The engine may include grading and scoring a resource's skills sets, dividing applications into various tasks, determining the desired resource skills sets to complete the tasks, and matching a resource's skills sets with the desired skills sets for the tasks.

BRIEF DESCRIPTION OF THE DRAWINGS

A more complete understanding of the present invention may be derived by referring to the detailed description and claims when considered in connection with the figures, where like reference numbers refer to similar elements throughout the figures, and:

DETAILED DESCRIPTION OF EXEMPLARY EMBODIMENTS

The detailed description of exemplary embodiments of the invention herein makes reference to the accompanying block diagrams and flowcharts, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, for example, hard disks, CD-ROM, optical storage devices, magnetic storage devices, and/or the like.

The present invention may be described herein in terms of functional block components, optional selections and various processing steps. It should be appreciated that such functional blocks may be realized by any number of hardware and/or software components configured to perform the specified functions. For example, the present invention may employ various integrated circuit components, (e.g., memory elements, processing elements, logic elements, look-up tables, and the like), which may carry out a variety of functions under the control of one or more microprocessors or other control devices.

These software components may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These software components may also be stored in a computer-readable memory that may direct a computer or other programmable data processing apparatus to function in a particular manner, such that the instructions stored in the computer-readable memory produce an article of manufacture including instruction means which implement the function specified in the flowchart block or blocks. The software components may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions.

The software components of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stalling, published by Prentice Hall; all of which are hereby incorporated by reference.

Figure 1:
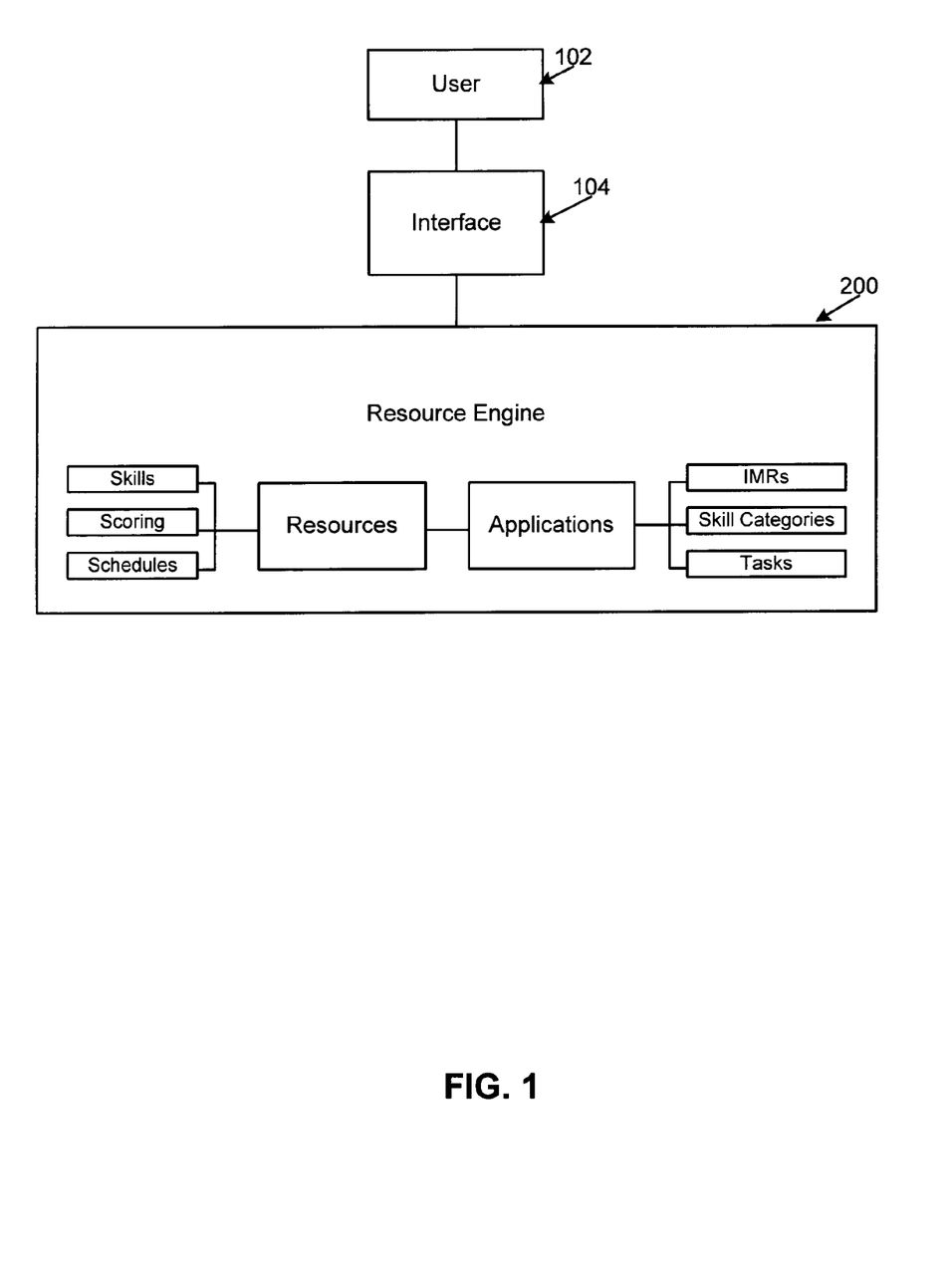
FIG. 1 includes a block diagram illustrating an exemplary system of the present invention.

In general, in accordance with various embodiments of the present invention, and with reference to FIG. 1, user 102 may access a resource engine 200 through interface 104 to facilitate management, assignment, grading and/or scoring of resources and/or applications.

As used herein, user 102 may include any person, employee, officer, entity, manager, business, client, corporation, customer, contractor, administrator, operator, hardware and/or software. The user 102 may interact with interface 104 or resource engine 200 via any hardware and/or software discussed herein. User 102 may be in a home or business environment with access to a network.

The terms management, assignment, grading and scoring, as used herein, may include any manipulation, tracking, assignment, management, grading, scoring, control, allocation, and/or any other modification to application information, resource information, skills information, and/or task information. Tasks may include problem tickets, enhancements, analyses, builds, designs, components, assemblies, and/or projects.

The user computer may provide a suitable website or other Internet-based graphical user interface which may be accessible by user 102. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Intervase, etc., may be used to provide an Active Data Object (ADO) compliant database management system. Any of the communications, inputs, storage, databases or displays discussed herein may be facilitated through a website having web pages. The term "web page" as it is used herein is not meant to limit the type of documents and applications that might be used to interact with user 102. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a server, wherein the request includes a URL and an IP address. The web service retrieves the appropriate web pages and sends the web pages to the IP address.

The user computer and/or interface 104 may include any remote interface or terminal through which user 102 may remotely access any option or function associated with resource engine 200. The user computer and/or interface 104 may include any of the input devices, computing units, or computing systems described herein, such as, for example, personal computer, workstation, kiosk, personal digital assistant, handheld computer (e.g., Palm Pilot®, Blackberry®), cellular phone and/or the like). Access may also be obtained using a conventional card reader which recognizes a magnetic stripe or bar code associated with appropriate user identification information, a biometric device, a smart card reader which recognizes information stored on a microchip integrated with appropriate user identification information, and any other device capable of accessing, interacting, transmitting, receiving, downloading, and/or uploading application related data transmitted electronically, magnetically, optically, and/or the like.

In an exemplary embodiment, and with reference to FIG. 1, communication between user 102 and resource engine 200 may be accomplished through interface 104. Communication may include any suitable communication means, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

Interface 104 may communicate with resource engine 200 through any of the communications networks described herein. In one embodiment, interface 104 permits user 102 to engage multiple features of resource engine 200 in an interactive online communications environment. The interactive online environment made available through interface 104 may be implemented in conjunction with other aspects of resource engine 200.

Interface 104 may not be limited to only one interface, as illustrated in FIG. 1, instead, interface 104 may include multiple interfaces that allow user 102 or multiple users to communicate with resource engine 200. By communicating, user 102 may exchange data and/or information in any form to or from resource engine 200.

The computing units discussed herein may be connected with each other via a data communication network, such as, for example, interface 104. Interface 104 may be a public network and assumed to be insecure and open to eavesdroppers. In the illustrated implementation, interface 104 may be embodied as the Internet. In this context, the computers may or may not be connected to the Internet at all times. For instance, user 102 may be using a computer that employs a modem to occasionally connect to the Internet, whereas the various components, programs and applications might be running on servers that maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors, (Sybex 1999); Deborah Ray and Eric Ray, "Mastering HTML 4.0" (1997); Loshin, "TCP/IP Clearly Explained" (1997). All of these texts are hereby incorporated by reference.

A variety of conventional communications media and protocols may be used for data links such as, for example, a connection to an Internet Service Provider (ISP) over the local loop as may be typically used in connection with standard modem communication, cable modem, Dish networks, ISDN, Digital Subscriber Line (DSL), or various wireless communication methods. User 102 might also reside within a local area network (LAN) which interfaces to network via a leased line (T1, D3, etc.). Such communication methods are well known in the art, and are covered in a variety of standard texts. See, e.g., Gilbert Held, "Understanding Data Communications" (1996), hereby incorporated by reference. It will be appreciated that many aspects of the present invention could be formulated, such as, for example, one skilled in the art will appreciate that interface 104 may include any system or interface for exchanging data or transacting business, such as the Internet, an intranet, an extranet, WAN, LAN, satellite communications, and/or the like. It is noted that a network may be implemented as other types of networks, such as an interactive television (ITV) network.

Resource engine 200 may be a stand-alone system or incorporated into any pre-existing network or metrics system via any software and/or hardware customization or upgrades. Resource engine 200 may include any hardware and/or software discussed herein. Resource engine 200 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including resource data, application data, skill data, category data and/or like data that could be used in association with the present invention. As those skilled in the art will appreciate, resource engine 200 computer will typically include an operating system (e.g., Windows NT, 95/98/2000, Linux, Solaris, etc.) as well as various conventional support software and drivers typically associated with computers.

Resource engine 200 may also be used in conjunction with any monitoring system, hardware or software, configured to monitor, manage and track systems within resource engine 200. One example of such monitoring system is an off-the-shelf program such as IBM's® Tivoli NetView, which automatically detects problems and responds to those problems at a local level. For example, NetView may detect a problem with an application and generate an information management record (IMR) in conjunction with that problem. The IMR from the monitoring system may then be transmitted to resource engine 200 through any of the communications networks described herein.

Similarly, resource engine 200 may include, or be used in conjunction with, any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, the invention may be implemented using TCP/IP communications protocols, IPX, Appletalk, IP-6, NetBIOS, OSI or any number of existing or future protocols.

As used herein, the term network shall include any electronic communications means which incorporates both hardware and software components of such. For example, a network may include any distributed system, such as a mainframe complex, thin cable network, Ethernet, token ring network, intranet, Internet, Local Area Network (LAN), wide area network (WAN), and/or any other method or system of communications described herein. A network may be suitably coupled to resource engine 200 via data links, such as a hardware and/or software interface similar to interface 104 or any of the interfaces discussed herein. In an exemplary embodiment, the network may be an internal corporate network comprising various components, applications and subsystems.

Figure 2:
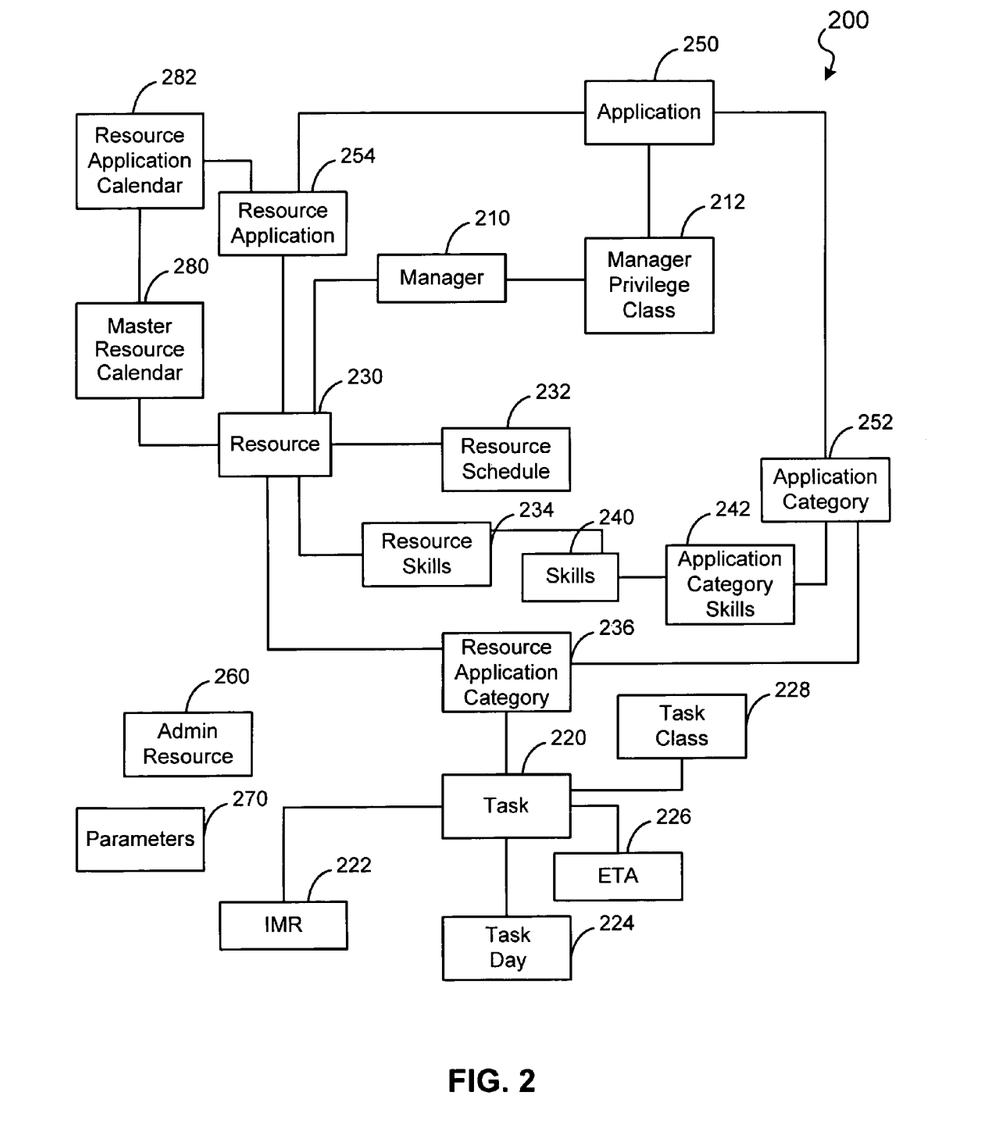
FIG. 2 includes a block diagram illustrating additional details of the resource engine component.

More particularly, with respect to resource engine 200, in one embodiment illustrated in FIG. 2, resource engine 200 includes a variety of subprograms and/or databases for managing, tracking, grading, and assigning resources, applications, skills, and tasks. Resource engine 200 interfaces with various subprograms or databases, wherein the subprograms may be part of a network. One skilled in the art will appreciate that resource engine 200 may interface with components directly, through a LAN network or indirectly via any other system or network.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables may be preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, for example, storing individual files using an ISO/IEC 7816-4 file structure; implementing a domain whereby a dedicated file may be selected that exposes one or more elementary files containing one or more data sets; using data sets stored in individual files using a hierarchical filing system; data sets stored as records in a single file (for example, compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats may be facilitated by storing the information as a Block of Binary (BLOB). Thus, any binary information may be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with a wide variety of system components by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that may be stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the network. The annotation may comprise a short header, trailer, or other appropriate indicator related to each data set that may be configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the issuer, user, transaction/membership account identifier or the like. Each of these condition annotations are further discussed herein.

With reference again to an exemplary embodiment depicted in FIG. 2, the databases may be managed by an administrative resource 260. Administrative resource may be an individual, software, and/or hardware configured to facilitate management, control, organization and/or oversight of resource engine 200. Additionally, there may be one or more parameters 270 governing resource engine 200. Parameters 270 may include, for example, security features, software requirements, hardware requirements, coding protocols and/or other requirements or preferences.

The databases comprising resource engine 200 may be interconnected such that information from one database may be accessed by one, two, three or more other databases. By the term "access," the databases may transmit, receive, obtain, link, connect, associate, interface, share, route, acquire, ascertain, retrieve, and gain information from one database to another. Thus, any information updated, received and/or sent to one database such as, for example, resource database 230, may be automatically updated throughout all or any portion of the other databases that are accessed by resource database 230.

For example, a resource database 230 may access a master resource calendar 280 for scheduling all resources. Master resource calendar 280 may additionally access resource application calendar 282 to access calendar and schedule information relating to the applications to which resource 230 may be assigned. Resource database 230 may also access a resource schedule 232 for scheduling that specific resource. Additionally, resource database 230 may access a resource skills database 234 comprising information relating to the various skills of resource 230. Resource database 230 may access a resource application database 254 comprising information relating to the application that resource 230 is assigned to support. Further, resource database 230 may access a resource application category 236 comprising information relating to specific category subset of an application that a resource is assigned to support. Finally, resource database 230 may access a manager database 210 comprising information on managers and the portfolios for which the managers are responsible.

With further reference to an exemplary embodiment depicted in FIG. 2, application 250 may also interface with a plurality of databases. For example, a manager privilege class 212 database may access application 250 to obtain information regarding the queues of problem tickets assigned to various managers 210. Resource applications 254 may also access application 250 in order to provide resource 230 updates, changes and/or other information to application 250. Application 250 may further be accessed and divided into various sub-application categories 252. Application categories 252 may be further accessed by Application category skills 242 in order to determine what skills 240 are needed to support application category 252. Application categories 252 may also be accessed by resource application categories 236 in order to link resources 230 to applications 250.

With further reference to an exemplary embodiment illustrated in FIG. 2, task databases 220 may also interface with a plurality of databases. For example, task 220 may access resource application category 236. Additionally, task 220 may access an IMR database 222, which may provide information on specific tasks associated with an IMR. Further, task 220 may access databases such as a task class 228, an estimated time of arrival (ETA) 226, and a task day 224 database. Task class 228 may provide information on the classification of task 220, for example, whether task 220 is a build task. ETA 226 may provide estimations on task 220 completion times based on previous task completion times. Task day 224 may provide scheduling information for task 220 relating to when task 224 was assigned and/or when it is scheduled to be completed.

While FIG. 2 illustrates a plurality of databases interfacing in a specific manner, any of the databases comprising resource engine 200 may interface to one another in any manner, and the interfaces or connections are not limited to those depicted. For example, task day 224 may additionally access master resource calendar 280 and/or any other database comprising resource engine 200.

In an exemplary embodiment, the databases within resource engine 200, as illustrated in FIG. 2, may operate in real-time. In this context, "real-time" includes information that may be immediately, or nearly immediately, accessed at the time an IMR and/or task is generated. For example, upon detection of an application problem, an IMR is generated. This IMR is then automatically broken down into applications and application tasks. The tasks are further automatically assigned to managers and/or resources based on skill and availability. As such, upon discovery of an IMR, user 102 may immediately view or manage resources, applications, skills, and/or tasks associated with the IMR on resource engine 200 via interface 104. Resource engine 200 may also immediately facilitate updates to resources, applications, skills, and/or tasks to a network such that user 102 may view any manual assignment or management changes through interface 104.

One skilled in the art will also appreciate that resource engine 200 may operate fully or partially in any less than real-time mode, such as, for example, batch processing. In an exemplary embodiment, the system may operate partially in real-time and partially in batch mode, wherein during batch mode, system information may be stored, and periodically updated to the network. Thus, in this embodiment, user 102 may access resource engine 200 at a later time through interface 104 to manage, assign, track, score or grade resources, tasks, applications, and skills.

The present invention may use the foregoing system components to perform the following method, wherein the exemplary steps discussed may be performed in any order. With respect to FIG. 3, user 102 may access resource engine 200 through interface 104 (step 301) by any communication method discussed herein. In one embodiment, the user 102 selects a web-based option for interfacing with resource engine 200 such that the system presents the user 102 with an input screen. The input screen may include a sign-on screen requesting input information (step 303) through which resource engine 200 may verify or authenticate if user 102 is an identified and/or valid user (step 305). Resource engine 200 may conduct an authorization by any method now known or hereafter devised, such as, for example, by use of cookies, or direct user input. For example, user 102 may be presented with a temporary greeting page, which prompts user 102 for an ID, password and region of operation. The user ID may be any security and/or resource access control facility (RACF) identification or other device configured to facilitate identification. The password may be any user defined or assigned password. The authentication may also include a biometric sample, code, device, name, abbreviation, authorization/access code, personal identification number (PIN), Internet code, corporate identification number, account number, charge card, credit card, debit card, telephone card, smart card, magnetic stripe card, bar code card, and/or any other authorization system or method. Additionally, the authorization may be implemented with any form of electronic, magnetic, and/or optical device capable of transmitting or downloading data from itself to a second device.

Figure 3:
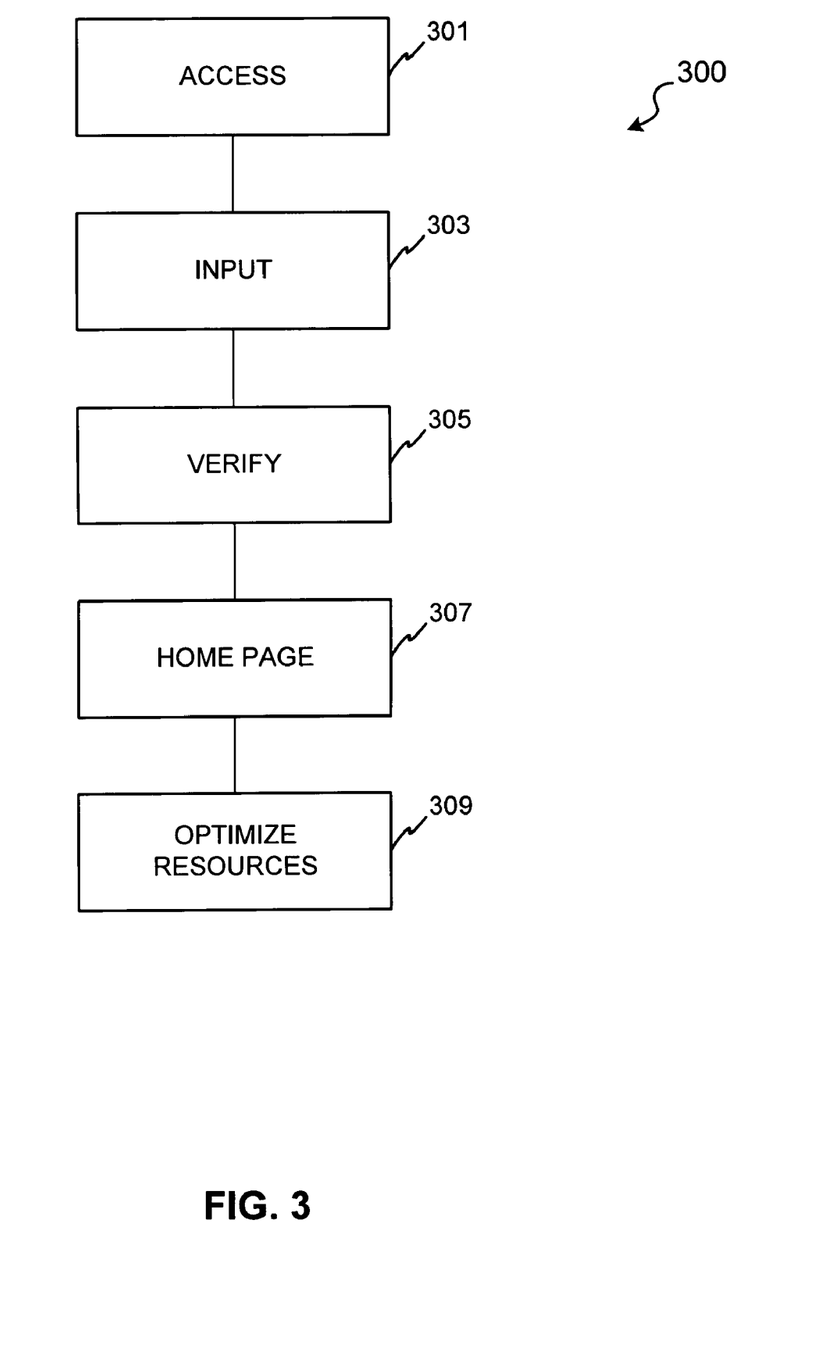
FIG. 3 includes a flowchart illustrating an exemplary general method for accessing and using a resource engine.

Once the user information is properly authenticated, user 102 may be granted access to interface with resource engine 200. The engine then may transmit a homepage and/or a resource webpage for display on user's 102 computer (step 307). The homepages and/or resource webpages may facilitate access to resource engine 200 for the optimization of resources (step 309). Alternatively, users not properly authenticated, either through user error or because of unauthorized use, are not permitted access to resource engine 200. One skilled in the art will appreciate that many additional security measures may be employed in accordance with the login and authentication systems and methods described herein.

Figure 4:
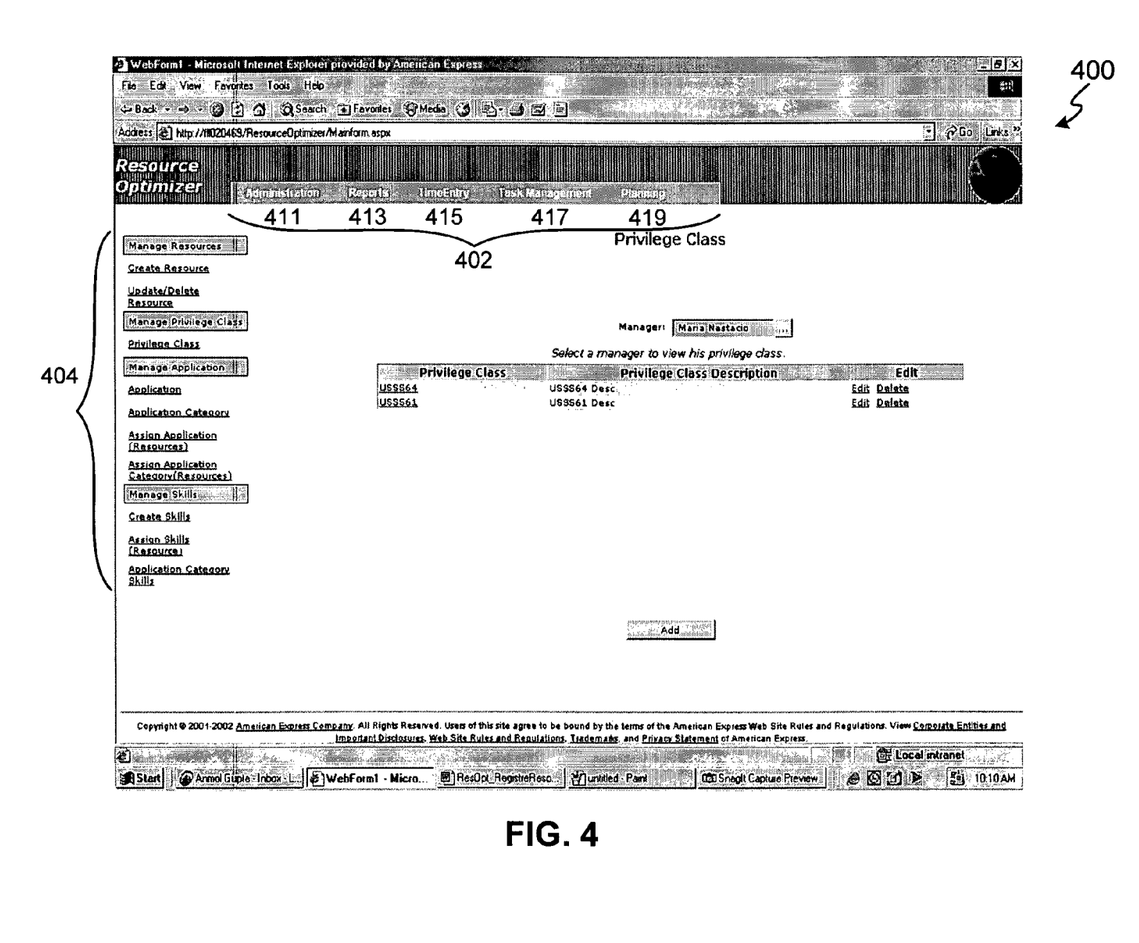
FIG. 4 includes a screen shot showing an exemplary main form of the resource optimizer in accordance with the present invention.

With reference to an exemplary screen shot illustrated in FIG. 4, user 102 may be presented with a homepage and/or a resource webpage 400. Resource webpage 400 may be configured with one or more toolbars 402 and/or task bars 404 that facilitate navigation of engine 200. Toolbar 402 may be configured to be visible to user 102 at all times when navigating engine 200 through interface 104. Taskbar 404 may be configured to facilitate resource optimization for the specific tool chosen through toolbar 402.

With continued reference to FIG. 4, webpage 400 may also be configured to facilitate user 102 using toolbar 402 in selecting a variety of tools to be used by the present invention. These tools may include, for example, managing users, IMRs, applications and skills through, for example, "ADMINISTRATION" 411; viewing reports on resource tasks and skills, "REPORTS" 413, entering and viewing time, "TIME ENTRY" 415; creating, assigning and updating tasks, "TASK MANAGEMENT" 417; and/or creating resource rosters, schedules, and training "PLANNING" 419. The details of these tools will be discussed below. In accordance with a further aspect of the present invention, one skilled in the art will appreciate that the web environment may be customizable and scalable, offering various other homepage 400 options depending upon the particular needs of user 102.

In accordance with the present invention, as illustrated in FIGS. 1, 3 and 4, user 102 may interact with resource engine 200 through interface 104, using a device configured to facilitate interaction such as ADMINISTRATION 411, available through webpage 400. When accessing administration information through ADMINISTRATION 411, user 102 may be presented with a variety of options regarding the information accessible through taskbar 404. These may include, for example, "Manage Resources," "Manage Privilege Class," "Manage Application," and "Manage Skills." Each of these various categories may contain one or more additional links to further resource optimization.

The various resource fields may include, for example: First Name, Middle Name, Last Name, Phone Number, E-mail Address, Employer, Role, Manager, Location, Portfolio Description, Skill, Skill Level, Application, Resource Percentage, Start Date, and Weekly End Date. By selecting "Manage Resources," user/manager 102 may manage resources within its group by selecting the link/button indicating that specific task. By the terms "manage" and "management," user/manager 102 may add, edit, delete, save, assign, reassign, search, define, determine, create, and/or cancel information relating to resources within its group. For example user/manager 102 selecting the Edit button may make changes to various fields associated with a resource.

"Manage Resources" may be configured such that the only time any of the Add, Edit, Delete, Save, or Cancel buttons will display is if the person trying to administer a resource has rights to do so. Thus, only a administrator, manager, manager/lead, and/or any other authorized person may update the Manage Resource screen. Resource engine 200 may be configured such that all buttons will be grayed out or un-selectable to users 102 without access rights.

After an authorized user/manager 102 inputs changes, resource engine 200 may be configured to present an error message if all required fields are not completed. If all required fields are completed, information inputted into the fields may be automatically updated into resource engine 200.

ADMINISTRATION 411 may additionally facilitate the management of privilege classes through the "Manage Privilege Class" option on task bar 404. Privilege classes may include designations, such as queue names, relating to IMRs/application failures tracked through resource engine 200 and/or through a monitoring program, such as NetView working in conjunction with resource engine 200. For example, NetView may automatically identify and generate a problem ticket describing the root cause of a network failure. NetView may then transmit the problem ticket/IMR to a specific network failure privilege class within resource engine 200. Transmission of the IMR from NetView to resource engine 200 may be through any communications means described herein.

By selecting "Manage Applications," user/manager 102 may manage applications and application categories. Additionally, user/manager 102 may assign/add resources to applications and/or application categories. Applications may be any software applications, processes, procedures, scripts, programs, and/or protocols running on a system. For example, Microsoft Word, a Service Delivery Platform application, and a windows application. Application categories may be any subsets of Applications. For example, an Application may have a Distributive category and a Mainframe Category. By "assign" and/or "assignment," user/manager 102 may determine the resources to be assigned to applications, determine the resources to be assigned to application categories, define how much time a resource is assigned to an application or application category, determine the starting and/or ending date for an assignment for planning purposes, and/or track a resource's time spent on specific tasks, applications and/or application categories.

Additionally, user/manager 102 may use "ADMINISTRATION" 411 to facilitate the management of resource skills by selecting the "Manage Skills" task. "Manage Skills" may be used to facilitate managing skills and skill sets available and/or needed for applications and application categories, defining and scoring the skills and skill sets of resources, determining skill set levels needed for application categories, assigning resources to application categories based upon resource skills and/or skill sets scores, determining skill set scores for resources assigned to those application categories, and redefining resource skills and/or skills set scores.

Resource engine 200 may employ one or more algorithms to facilitate the management of resource skills. That is, one or more algorithms may be used in defining, scoring, determining, and assigning resources, skills, skills sets, and skill set needs. These algorithms may be automated such that resource engine 200 automatically tracks resources and application categories to continuously rescore and grade resource skills, skill sets and application categories. Resource engine 200 may also be configured to allow for manual calculation, scoring, and grading of resource skills, skill sets and application categories for assignment and management purposes.

User/manager 102 may assign one or more skills to a specific category. For example, one application category (e.g., Service Delivery Platform services) may include multiple skills (a "skill set") to support it such as: Visual Basic, Microsoft SQL, exchange management skills, phone payment skills, information management skills, and Cobol. User/manager 102 may additionally define "skill set" scores. For example, high Visual Basic, Microsoft SQL, and Cobol skills may be needed, while medium exchange management, and information management skills may be required and low phone payment skills may suffice. The skill set scores for the specific application category may be as follows:

| Skills | Skill Level | Score |
| --- | --- | --- |
| Visual Basic | H | 80 |
| Microsoft SQL | H | 80 |
| exchange management | M | 60 |
| phone payment | L | 30 |
| information management | M | 60 |
| Cobol | H | 80 |
| Total | | 390 |

The application category skills may be further scored to determine the score parameters for the skill levels needed to support the category. For example, high skill levels would encompass scores that are 80 % of 390 and above. An example of the parameters can be viewed in the following table:

| | | |
| --- | --- | --- |
| 80% | H | 312 |
| 60% | M | 234 |
| 30% | L | 117 |

Resource engine 200 may be used to facilitate scoring skills and/or skill sets of resources. By "scoring," user/manager 102 defines a resource's skills for a specific category.

The score levels may be, for example, high, medium, or low, wherein a high score may be assigned, for example, 80 points, a medium score may be assigned 60 points and a low score may be assigned 30 points.

For example, a resource's skills may be defined as follows:

| Skills | Skill Level | Score |
|---|---|---|
| Visual Basic | M | 60 |
| Microsoft SQL | H | 80 |
| exchange management | L | 30 |
| phone payment | M | 60 |
| information management | L | 30 |
| Cobol | M | 60 |
| Total | | 320 |

The resource's skill set may be then compared to a category skill set to determine if the resource may be assigned to the category. This may be done by calculating a total resource category score based on the lower of the resource and category skill scores. In the provided example, the resource's category skill score is 290. The resource therefore has medium-level category skills (where medium is any score from 234-311).

| Resource Skill Score | Category Skill Score | Resource Category Score |
|---|---|---|
| 60 | 80 | 60 |
| 80 | 80 | 80 |
| 30 | 60 | 30 |
| 60 | 30 | 30 |
| 30 | 60 | 30 |
| 60 | 80 | 60 |
| Total 320 | 390 | 290 |
| | Category Level | M |

User/manager 102 may also use resource engine 200 to facilitate defining resource application portfolios. For example, resource engine 200 may be configured to gather all the application categories for a resource's portfolio of applications the resource is desired to support. Resource engine 200 may be configured to compute scores for the application categories in order to determine a rating for the resource, where the rating may range from a G1 (the lowest) to a G5 (the highest).

For example, a resource's application portfolio may contain three application categories. The resource may have ten different skills, each skill may be scored as follows:

| Skills | Skill Level | Score |
|---|---|---|
| Skill-1 | H | 80 |
| Skill-2 | M | 60 |
| Skill-3 | M | 60 |
| Skill-4 | L | 30 |
| Skill-5 | H | 80 |
| Skill-6 | H | 80 |
| Skill-7 | M | 60 |
| Skill-8 | M | 60 |
| Skill-9 | L | 30 |
| Skill-10 | M | 60 |

The three application categories in the resource's portfolio may have the following required skill sets:

Application Category 1

| Skills | Skill Level | Score |
|---|---|---|
| Skill-1 | M | 60 |
| Skill-2 | L | 30 |
| Skill-3 | H | 80 |
| Skill-4 | M | 60 |
| Skill-5 | L | 30 |
| Total Score | | 260 |
| 80% | H | 208 |
| 60% | M | 156 |
| 30% | L | 78 |

Application Category 2

| Skills | Skill Level | Score |
|---|---|---|
| Skill-2 | M | 60 |
| Skill-6 | L | 30 |
| Skill-7 | H | 80 |
| Total Score | | 170 |
| 80% | H | 136 |
| 60% | M | 102 |
| 30% | L | 51 |

Skill Category 3

| Skills | Skill Level | Score |
|---|---|---|
| Skill-3 | L | 30 |
| Skill-4 | H | 80 |
| Skill-7 | M | 60 |
| Skill-8 | L | 30 |
| Total Score | | 200 |
| 80% | H | 160 |
| 60% | M | 120 |
| 30% | L | 60 |

Thus, the resource will have a portfolio score as follows:

| Application Category 1 | | | Application Category 2 | | | Application Category 3 | | |
|---|---|---|---|---|---|---|---|---|
| Res. Skills | Cat. Skills | Score | Res. Skills | Cat. Skills | Score | Res. Skills | Cat. Skills | Score |
| 80 | 60 | 60 | 60 | 60 | 60 | 60 | 30 | 30 |
| 60 | 30 | 30 | 80 | 30 | 30 | 30 | 80 | 30 |
| 60 | 80 | 60 | 60 | 80 | 60 | 60 | 60 | 60 |
| 30 | 60 | 30 | | | | 60 | 30 | 30 |
| 80 | 30 | 30 | | | | | | |
| Total | | 210 | Total | | 150 | Total | | 150 |
| Level | | H | Level | | H | Level | | M |
| Portfolio Total Score | | | | | | | | 510 |

Resource engine 200 determines the rating of the resource based on the percentage of the total application category score the resource scores in:

| G-Rating | |
|---|---|
| G1 | Greater than 0 but less than 75% |
| G2 | Greater than or equal to 75% but less than 90% |
| G3 | Greater than or equal to 90% but less than 110% |
| G4 | Greater than or equal to 110% but less than 125% |
| G5 | Greater than 125% |
| G-Rating | % of average standard hours |

| Application X | |
|---|---|
| Catg | Total Score |
| Catg-1 | 260 |
| Catg-2 | 170 |
| Catg-3 | 200 |
| Total | 630 |
| 1 | <472.5 |
| 2 | <567 |
| 3 | <693 |
| 4 | <787.5 |
| 5 | >787.5 |

Thus, in order to achieve a G1 rating, the resource would need to score of less than 472.5. However, the resource in this example would rate as a G2 because the resource's total portfolio score is 510, which is greater that the 75% range of the total category score of 630, but less than the 90% range.

Each portfolio may have its own defined scoring based on application categories that make up the portfolio. The selection process may be chosen by a manager and/or resource engine 200 which selects specific application categories for all applications the manager and/or resource engine 200 supports or by gathering all application categories for a specific resource.

In accordance with another aspect of the present invention, when hiring new hires, resource engine 200 may be configured to facilitate the generation of a portfolio application required for the new hire and a generation of a listing of skills that comprise the portfolio. Resource engine 200 may further be configured to facilitate grading of each skill based on interview answers and generating a total score and G rating for the potential new hire.

Further, resource engine 200 may be used to determine current resource skill levels in order to determine hiring needs, training needs, equipment, software, and/or hardware upgrades, and/or other needed support. Resource engine 200 may employ one or more algorithms to facilitate a determination of current resource skill levels. That is, one or more algorithms may be used in generating a portfolio application for a potential new hire, generating a listing of skills within the portfolio, grading the skills based on potential new hire answers, and generating a total score for the potential hire. These algorithms may be automated such that resource engine 200 automatically generates and grades potential new hire portfolios and interview. Resource engine 200 may also be configured to allow for manual generation of portfolios and portfolio skills and grading of potential hires.

With reference again to an exemplary embodiment depicted in FIG. 4, "TIME ENTRY" tool 413 may be accessed by user 102 to log time entries into a timesheet. Access to the timesheet may be limited to only those with rights to do so. Information logged into the timesheet may be available throughout resource engine 200 for planning, scheduling, task assignment and/or resource management.

Resource engine 200 may also be configured to provide for "TASK MANAGEMENT" 415 available through webpage 400. This tool may be used to facilitate management of application tasks. Tasks may include an assembly or component type. An assembly may be a task that defines subordinate tasks which in turn may be an assembly or component. Assembly tasks may not define a resource or hours to complete. A component task may be a task which cannot define subordinate tasks. The component task may have a resource assigned to it and an expected time to complete. Each task may be assigned to an application category and an application. Additionally, each task may have one or more subtasks with each subtask having a resource assigned to it. One manager may be assigned to each task.

Tasks may be further categorized by class. For example, tasks generated from problem tickets may be classified as IMRs. Other classes may include assembly, meetings, training, bridge calls, projects, analysis, design, and build tasks.

Resource engine 200 may also be used to facilitate the creation of subtasks associated with each task. For example, once an IMR is generated, subtask 123 may be the first task generated. Subtask 123 may relate to re-installing problem software. Additionally, another subtask for analyzing the re-installed software may be generated. An analyst resource may then review the re-installation and determine that another analysis and/or installation task needs to be assigned. Resource engine 200 may be configured to automatically generate subtasks based on pre-programmed standards. For example, resource engine 200 may be pre-programmed to assign tasks relating to re-installation of software and analysis of a network whenever a network failure occurs. Resource engine 200 may also be configured for manual creation and/or reassignment of subtasks associated with each task.

Resource engine 200 may also be configured to automatically reassign a task and/or subtask to another resource if a resolution of the IMR has not been accomplished within a set time period. For example, resource engine 200 may first assign IMR-related tasks of re-installation and analysis to be completed within 10 working hours. If the IMR has not been completed within a certain set time, such as, for example 15 hours, resource engine 200 may automatically reassign the re-installation and/or analysis tasks.

Resource engine 200 may also be configured to automatically generate a log of information relating to the resources and tasks already completed and/or worked on relating to the IMR. For example, if Word, Excel and PowerPoint have already been reinstalled successfully, resource engine 200 may be configured to create a log of this information before reassigning the task.

Resource engine 200 may be configured to facilitate the grading of tasks as well. Tasks may also receive the same G-1 through G-5 ratings as resources. The ratings may be based on the actual hours taken to complete a task compared to a standard. The standard hours for a task may be defined by a lead programmer, a manager, and/or resource engine 200 using a model based on subjective standards for task completion times. The standard hours to complete a task may be based on the skill level of an average resource supporting an application. For resources with high skills, the standard hours may be 90% of the average standard hours. Similarly, for low skill resources, the standard hours may be 110% of the average standard hours.

Ratings may be computed assuming the actual hours spent on a task. Errors may be created in labor tracking and often measuring a specific task may be inaccurate. However, resource engine 200 may increase accuracy by combining the total effort for all tasks in a specified window of time. The bigger the window of time and/or the more tasks that are being graded, the more accurate the grading score.

For any chosen window, there may be the possibility of having open tasks and closed tasks. Resource engine 200 may be configured to grade only closed tasks. If a closed tasks falls partly within a window, it may be graded based on the percentage of the task within the window being graded. In order to determine this percentage, resource engine 200 may be configured to define a Factor to adjust the standard hours in the window. The Factor may be created as follows:

$$\text{Factor} = \frac{\text{Task Actual hours defined within window interval}}{\text{Total task Actual}}$$

Resource engine may be configured to multiply the Factor and the standard hours to determine the adjusted standard hours for a task. For example:

Task B has 10 actual task hours and the hours are defined within the window Task B has a factor of 1 (10/10=1).

Task A has 15 actual task hours, 12 hours are defined within the window, and 3 hours are outside of the window.

Task A has a factor of 0.8 (12/15=0.8)

Resource engine 200 may also be configured to grade the efficiency of tasks. In order to obtain a Grading efficiency for closed tasks, resource engine 200 may total all the closed tasks hours within a window and then divide that number by the sum of all task hours within the same window. The following example shows a window of 100 hours with 90 closed hours within the window.

The result is a grading efficiency of 90%. Based on a grading efficiency of 90, the G-rating would be G3.

The following is an example of how a resource task may be graded by resource engine 200. The diagram below illustrates 10 tasks assigned to a resource. It shows how the tasks relate to a window defined by the resource start and end dates.

The following chart shows that tasks 1 through 9 are closed and task 10 is still open. Resource engine 200 may use only the closed tasks for the grading. The total task hours equals 174 but only the closed task hours, equaling 166, may be used in the grading.

The chart also shows that task 1 has 20 actual hours but only 16 actual hours are inside of the window selected to grade. Resource Engine 200 may use a factor of 0.80 (16/20) to obtain the adjusted standard hours needed to do grading. Tasks 2 through 9 are all within the window so their factor is equal to 1.00.

| | | Actual Task Hours | | |
|---|---|---|---|---|
| Task | Status | Task | Window | Factor |
| Task - 1 | Closed | 20 | 16 | 0.80 |
| Task - 2 | Closed | 30 | 30 | 1.00 |
| Task - 3 | Closed | 11 | 11 | 1.00 |
| Task - 4 | Closed | 17 | 17 | 1.00 |
| Task - 5 | Closed | 60 | 60 | 1.00 |
| Task - 6 | Closed | 14 | 14 | 1.00 |
| Task - 7 | Closed | 3 | 3 | 1.00 |
| Task - 8 | Closed | 9 | 9 | 1.00 |
| Task - 9 | Closed | 6 | 6 | 1.00 |
| Task - 10 | Open | 12 | 8 | |
| Total closed | task hours | | 166 | |
| Total | task hours | | 174 | |

The next chart shows the application category assigned to the closed tasks and the standard hours associated with each application category. Resource engine 200 may be configured to multiply the standard hours against the factor to arrive at the adjusted standard hours. Resource engine 200 may additionally be configured to add the adjusted standard hours for all the closed tasks in order to obtain the total standard hours.

| Application | Task | Standard Hours | Factor | Adjusted Standard Hours |
|---|---|---|---|---|
| Application Category 1 | Task - 1 | 16 | 0.80 | 12.8 |
| Application Category 1 | Task - 2 | 32 | 1.00 | 32.0 |
| Application Category 1 | Task - 3 | 8 | 1.00 | 8.0 |
| Application Category 1 | Task - 4 | 16 | 1.00 | 16.0 |
| Application Category 2 | Task - 5 | 64 | 1.00 | 64.0 |
| Application Category 2 | Task - 6 | 16 | 1.00 | 16.0 |
| Application Category 1 | Task - 7 | 4 | 1.00 | 4.0 |
| Application Category 1 | Task - 8 | 8 | 1.00 | 8.0 |
| Application Category 3 | Task - 9 | 4 | 0.80 | 4.0 |
| | | Total Standard Hours | | 164.8 |

After resource engine 200 has determined the total standard hours, resource engine 200 can assign a grade and grade efficiency to the application category tasks. In the example herein, the resource task grade would be G3 since 166 is under 181 and the Grade efficiency equals 95.4%.

| Rating | Standard Hours = Weight | 164.8 Score |
|---|---|---|
| G1 | 75% | 124 |
| G2 | 90% | 148 |
| G3 | 110% | 181 |
| G4 | 125% | 206 |
| G5 | Anything higher | |

In accordance with an exemplary aspect of the present invention, resource engine 200 may be configured to facilitate assignment of tasks to resources. With reference to an exemplary flowchart illustrated in FIG. 5, a new IMR may be detected (step 501) by resource engine 200 or by a software program such as NetView connected to resource engine 200. Resource engine 200 may then assign the IMR to an application category (step 503). Resource engine 200 may use any method discussed herein for assigning to an application category. Resource engine 200 may then assign the IMR to a resource (step 505) based upon the resource's skill.

Figure 5:
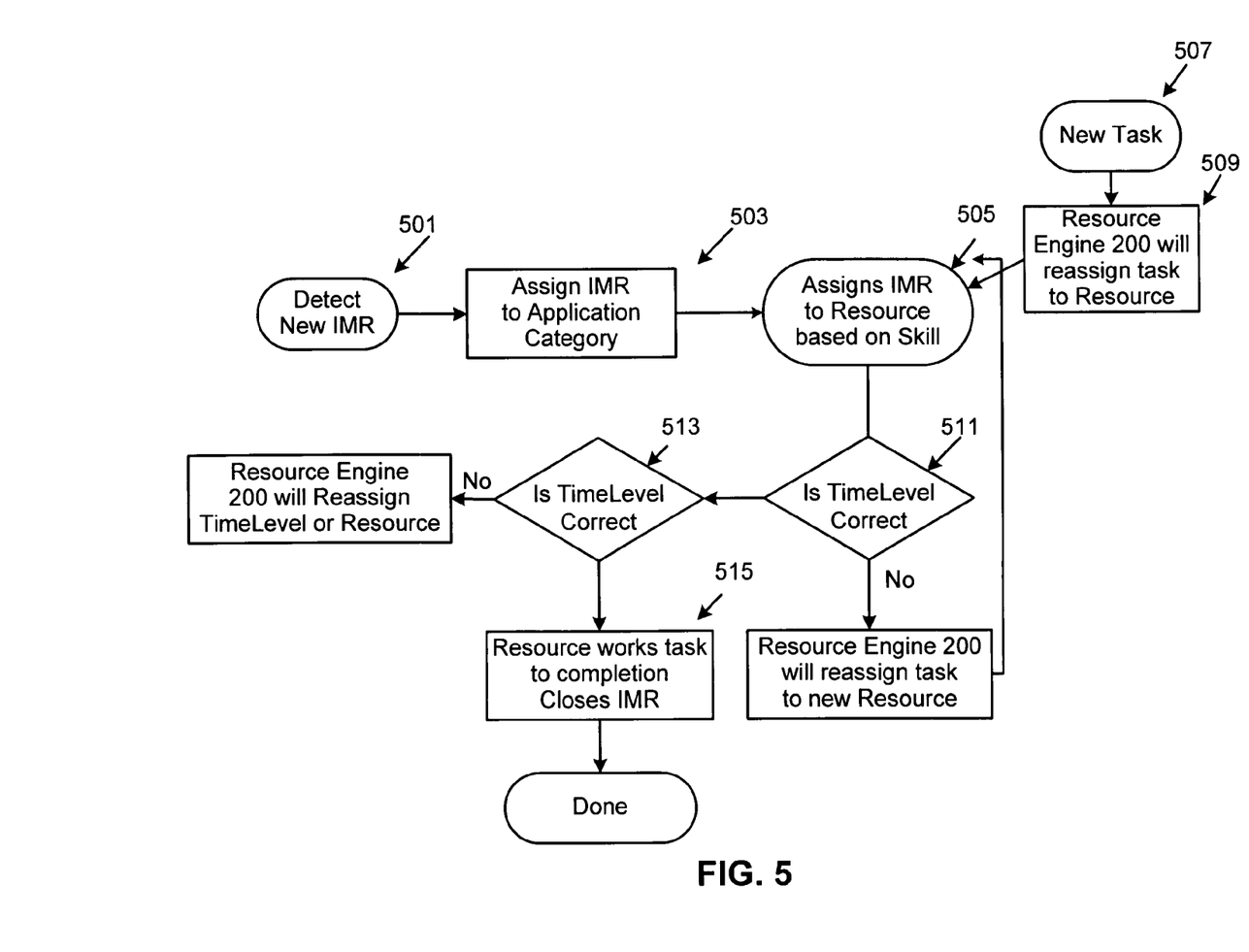
FIG. 5 includes a flowchart illustrating an exemplary method for assigning tasks in accordance with the present invention.

Resource engine 200 may also generate a new task (step 507) at the same time the new IMR is detected. Resource engine 200 may then assign the new task (step 509) to a resource by any method discussed herein for assigning tasks. Resource engine 200 may then determine whether resource engine 200 can do the task based on the resource's skills (step 511). If the resource cannot do a task, resource engine 200 may reassign the task to a new resource.

Resource engine 200 may also be configured to determine whether scheduling allows for a resource to complete a task in a specific time level (step 513). Resource engine 200 may access master calendars, master schedules, resource calendars, and/or resource schedules in order to determine optimum scheduling. If scheduling does not permit a resource to do a task within a time level, resource engine 200 may reassign the task to a new resource.

Once resource engine 200 has assigned a task to a resource whose schedule fits the correct time period, the resource may work the task to completion (step 515). If the resource encounters problems with the task and needs additional help, resource engine 200 may assign any additional tasks in a similar manner.

With reference again to FIG. 4, "PLANNING" 417 may be accessed within resource engine 200 to facilitate the creation of employee rosters, the scheduling of meetings, training, tasks, personal time and projects, and the calendaring of resources, tasks and projects. User/manager 102 may select create, manage, add, delete, update and/or define resource schedule hours per work week. Additionally, resource engine 200 may be used to facilitate the creation of a resource calendar of the schedules of all user/manager's 102 resources.

User/manager 102 may also access resource engine 200 to facilitate the creation of a master resource calendar. A master resource calendar may include capacity hours, personal hours, and compensation hours. Capacity hours are the number of hours of planned capacity for a resource. For example, if a resource is scheduled to work eight hours per day each five-day work week, the capacity for the resource would be 40 hours. The Capacity hours may be recomputed monthly, weekly, daily and/or annually. Personal hours may be vacation time, sick time, visa constraint time, jury duty time, and/or any other type of time off of work. Personal hours may vary from one resource to another. Compensation hours may include time a resource is allowed to take off for overtime hours previously worked. Resource engine 200 may be configured to compute available hours based upon the Capacity hours minus Personal hours and Compensation hours.

User/manager 102 may also access resource engine 200 to facilitate the management of a resource application calendar. A resource application calendar may store resource-specific information regarding the actual hours spent by a resource on an application, the number of hours planned for meetings and training, and whether a resource is working within its capacity. Resource engine 200 may connect the master resource calendar with a resource application calendar to best schedule resources and determine resource actualized hours.

Resource engine 200 may also be configured to provide for "REPORTS" 419 available through webpage 400. This tool may be used to facilitate the generation of resource task and skill reports. The reports may be used by user/manager 102 to manage local and remote resources. For example, resource engine 200 may be used to generate reports on resource performance, resource capacities, resource training needs, resource skill sets, resource deficiencies, task performance, task resource needs, task skill set needs, and application performance. Additionally, user/manager 102 may use REPORTS 419 to determine trends, problem areas, and efficiencies amongst resources, tasks, and applications. For example, user/manager 102 may access resource engine 200 to generate a report on various teams of resources to determine which teams work more effectively together and which teams under perform. Additionally, resource engine 200 may be used to facilitate a determination of hiring, training, and staffing needs.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

We claim:

1. A computer-implemented method for at least one of managing, assigning, grading, and tracking at least one of resources, tasks, applications, and skills, the method comprising:

defining a task associated with an application problem;

determining desired resource skills for completing the task;

grading skills of a resource to determine resource skill scores;

identifying one or more tasks worked on by the resource, wherein the one or more tasks are worked on, at least in part, during a window of time having a start time and an end time, and wherein each of the one or more tasks is either open or closed as determined by the status of the task at the end time;

calculating on a computer an efficiency score of the resource, the efficiency score being calculated according to the formula $$E = \frac{t_{closed}}{t_{total}},$$

wherein E is the efficiency score, $t_{closed}$ is a total time in the window during which the resource worked on the closed tasks, and $t_{total}$ is a total time in the window during which the resource worked on all tasks;

calculating on a computer, for each of the identified one or more closed tasks, factors, each factor being calculated according to the formula $$F = \frac{t_{window}}{t_{task}},$$

wherein F is the factor, $t_{window}$ is a total time in the window during which the resource worked on the corresponding closed task, and $t_{task}$ is a total time irrespective of the window during which the resource worked on the corresponding closed task;

computing on the computer, for each of the identified one or more tasks, an adjusted standard time, each adjusted standard time being a product of the corresponding factor and a corresponding standard time;

computing on the computer an adjusted standard time total, the adjusted standard time total being a sum of all of the corresponding adjusted standard times;

defining a plurality of ratings, each rating corresponding to a range of percentages of the adjusted standard time total;

matching the resource to one of the plurality of ratings based on the range of percentages of the adjusted standard time total corresponding to the efficiency score; and assigning the resource to the task associated with the application problem based at least in part on the desired resource skills, the resource skill scores, the efficiency score, and the one of the plurality of ratings matched to the resource.

2. The method according to claim 1, wherein defining a task, determining desired resource skills, grading skills, identifying one or more tasks, calculating an efficiency score, calculating factors, computing an adjusted standard time, computing an adjusted standard time total, defining a plurality of ratings, matching the resource, and assigning the resource is at least one of automatic and manual.

3. The method of claim 1, further comprising determining expected an completion time for each task worked on by the resource, wherein each completion time is based on a skill of an average resource performing the respective task.

4. The method of claim 1, further comprising obtaining information related to application problems including accessing a system for the management, assignment, grading, and tracking of at least one of resources, tasks, applications, and skills, the step of accessing including:

inputting authentication information including at least one of a name, password, and identification;

verifying the authentication information; and transmitting at least one of a homepage and webpage for interfacing with the system.

5. The method of claim 1, further comprising the step of optimizing resources, tasks, applications, and skills.

6. A computer-implemented method for assigning a resource to tasks and applications, the method comprising:

defining a task associated with an application problem;

determining desired resource skills for completing the task;

automatically grading skills of a resource to determine resource skill scores;

automatically identifying one or more tasks worked on by the resource, wherein the one or more tasks are worked on, at least in part, during a window of time having a start time and an end time, and wherein each of the one or more tasks is either open or closed as determined by the status of the task at the end time;

automatically calculating on a computer an efficiency score of the resource, the efficiency score being calculated according to the formula $$E = \frac{t_{closed}}{t_{total}},$$

wherein E is the efficiency score, $t_{closed}$ is a total time in the window during which the resource worked on the closed tasks, and $t_{total}$ is a total time in the window during which the resource worked on all tasks;

automatically calculating on a computer, for each of the identified one or more closed tasks, factors, each factor being calculated according to the formula $$F = \frac{t_{window}}{t_{task}},$$

wherein F is the factor, $t_{window}$ is a total time in the window during which the resource worked on the corresponding closed task, and $t_{task}$ is a total time irrespective of the window during which the resource worked on the corresponding closed task;

automatically computing on a computer, for each of the identified one or more tasks, an adjusted standard time, each adjusted standard time being a product of the corresponding factor and a corresponding standard time;

automatically computing on a computer an adjusted standard time total, the adjusted standard time total being a sum of all of the corresponding adjusted standard times;

automatically defining a plurality of ratings, each rating corresponding to a range of percentages of the adjusted standard time total;

automatically matching the resource to one of the plurality of ratings based on the range of percentages of the adjusted standard time total corresponding to the efficiency score; and automatically assigning the resource to the task associated with the application problem based at least in part on the desired resource skills, the resource skill scores, the efficiency score and the one of the plurality of ratings matched to the resource.

7. The method according to claim 6, wherein defining a task and determining desired resource skills are at least one of automatic and manual.

8. The method according to claim 6, further comprising comparing actual and expected task completion times.

9. The method according to claim 6, further comprising comparing resource efficiencies relating to application tasks.

10. The method according to claim 6, further comprising accessing a system for the management, assignment, grading, and tracking of at least one of resources, tasks, applications, and skills.

11. The method according to claim 6, further comprising determining whether a first resource can work a task, based upon a first resource schedule.

12. The method according to claim 11, further comprising reassigning the task to a second resource, based upon a second resource schedule, if the first resource schedule does not allow for assignment of the task.

13. An automated system comprising a computer-implemented device configured to at least one of manage, assign, grade, and track at least one of resources, tasks, applications, and skills, the device comprising:

a device configured to define a task associated with an application problem;

a device configured to determine desired resource skills for completing the task;

a device configured to automatically grade skills of a resource to determine resource skill scores;

a device configured to automatically identify one or more tasks worked on by the resource, wherein the one or more tasks are worked on, at least in part, during a window of time having a start time and an end time, and wherein each of the one or more tasks is either open or closed as determined by the status of the task at the end time;

a device configured to automatically compute an efficiency score of the resource, the efficiency score being calculated according to the formula $$E = \frac{t_{closed}}{t_{total}},$$

wherein E is the efficiency score, $t_{closed}$ is a total time in the window during which the resource worked on the closed tasks, and $t_{total}$ is a total time in the window during which the resource worked on all tasks;

a device configured to automatically compute, for each of the identified one or more closed tasks, factors, each factor being calculated according to the formula $$F = \frac{t_{window}}{t_{task}},$$

wherein F is the factor, $t_{window}$ is a total time in the window during which the resource worked on the corresponding closed task, and $t_{task}$ is a total time irrespective of the window during which the resource worked on the corresponding closed task;

a device configured to automatically compute, for each of the identified one or more tasks, an adjusted standard time, each adjusted standard time being a product of the corresponding factor and a corresponding standard time;

a device configured to automatically compute an adjusted standard time total, the adjusted standard time total being a sum of all of the corresponding adjusted standard times;

a device configured to automatically define a plurality of ratings, each rating corresponding to a range of percentages of the adjusted standard time total;

a device configured to automatically match the resource to one of the plurality of ratings based on the range of percentages of the adjusted standard time total corresponding to the efficiency score; and a device configured to automatically assign the resource to the task associated with the application problem based at least in part on the desired resource skills, the resource skill scores, the efficiency score, and the one of the plurality of ratings matched to the resource.

14. The system according to claim 13, wherein the devices configured to define tasks-and determine desired resource skills sets are configured to be at least one of automatic and manual.

15. The system according to claim 13 further comprising:
a device configured to grade and track resources and tasks by the use of an algorithm, the algorithm based upon at least one of: completion times for tasks and comparisons of resource efficiencies relating to tasks.

16. An automated system comprising a device configured to at least one of manage, assign, grade, and track at least one of resources, tasks, applications, and skills, the device comprising:

a device configured to grade skills of a resource to determine resource skill scores;

a device configured to define an application tasks;

a device configured to determine desired resource skills for completing the application task;

a device configured to identify one or more tasks worked on by the resource, wherein the one or more tasks are worked on, at least in part, during a window of time having a start time and an end time, and wherein each of the one or more tasks is either open or closed as determined by the status of the task at the end time;

a device configured to compute an efficiency score of the resource, the efficiency score being calculated according to the formula $$E = \frac{t_{closed}}{t_{total}},$$

wherein E is the efficiency score, $t_{closed}$ is a total time in the window during which the resource worked on the closed tasks, and $t_{total}$ is a total time in the window during which the resource worked on all tasks;

a device configured to compute, for each of the identified one or more closed tasks, factors, each factor being calculated according to the formula $$F = \frac{t_{window}}{t_{task}},$$

wherein F is the factor, $t_{window}$ is a total time in the window during which the resource worked on the corresponding closed task, and $t_{task}$ is a total time irrespective of the window during which the resource worked on the corresponding closed task;

a device configured to compute, for each of the identified one or more tasks, an adjusted standard time, the adjusted standard time being a product of the corresponding factor and a corresponding standard time;

a device configured to compute an adjusted standard time total, the adjusted standard time total being a sum of all of the corresponding adjusted standard times;

a device configured to define a plurality of ratings, each rating corresponding to a range of percentages of the adjusted standard time total;

a device configured to match the resource to one of the plurality of ratings based on the range of percentages of the adjusted standard time total corresponding to the efficiency score; and a device configured to assign the resource to the application task based at least in part on the resource skill scores and the one of the plurality of ratings matched to the resource.

* * * * *

UNITED STATES PATENT AND TRADEMARK OFFICE
CERTIFICATE OF CORRECTION

| | | |
|---|---|---|
| PATENT NO. | : 7,644,013 B2 | Page 1 of 1 |
| APPLICATION NO. | : 10/770684 | |
| DATED | : January 5, 2010 | |
| INVENTOR(S) | : Nastacio et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1390 days.

Signed and Sealed this

Sixteenth Day of November, 2010

David J. Kappos
*Director of the United States Patent and Trademark Office*